UNITED STATES PATENT OFFICE.

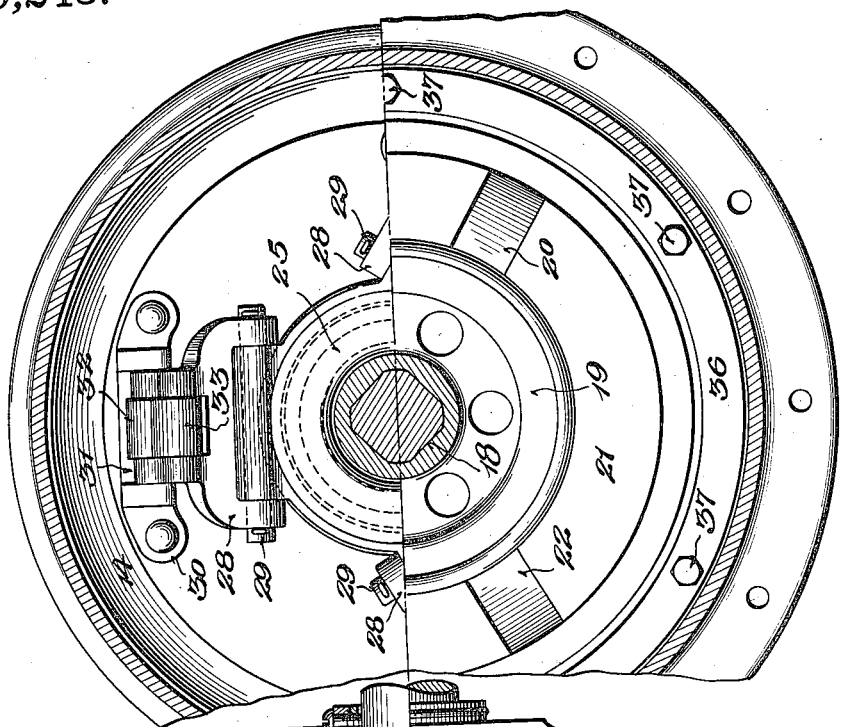
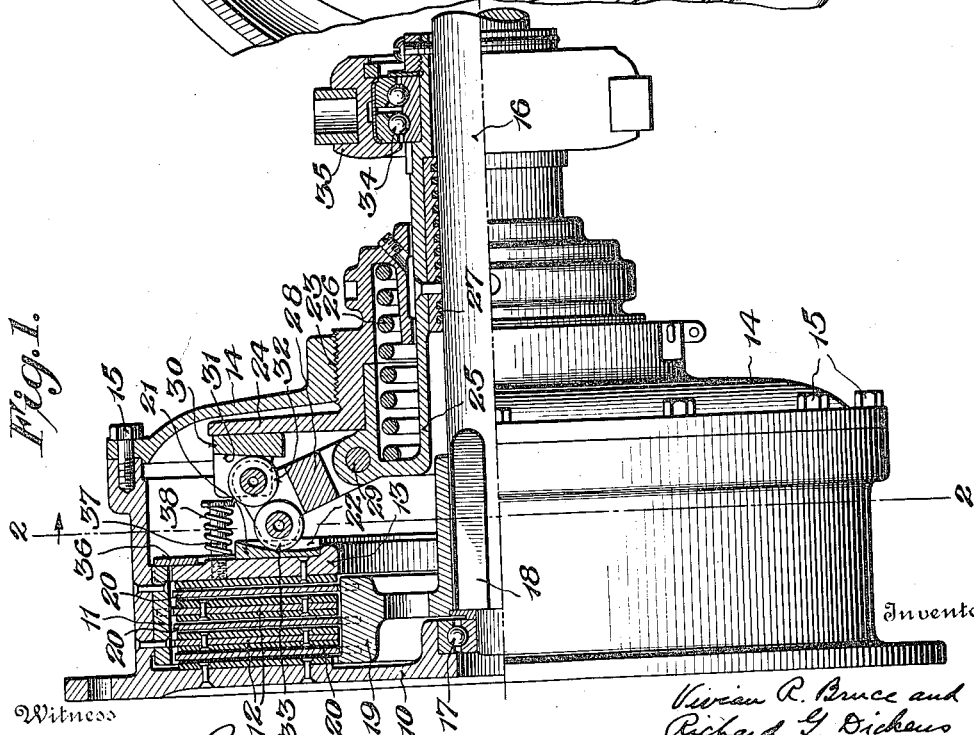

VIVIAN R. BRUCE AND RICHARD G. DICKENS, OF ELMIRA, NEW YORK, ASSIGNORS TO HILLIARD CLUTCH & MACHINERY COMPANY, OF ELMIRA, NEW YORK, A CORPORATION OF NEW YORK.

CLUTCH.

1,279,243.      Specification of Letters Patent.      Patented Sept. 17, 1918.

Application filed February 9, 1918. Serial No. 216,215.

*To all whom it may concern:*

Be it known that we, VIVIAN R. BRUCE and RICHARD G. DICKENS, citizens of the United States, and residents of Elmira, county of Chemung, State of New York, have invented a new and useful Improvement in Clutches, of which the following is a specification.

This invention relates to friction clutches and more particularly to that type of friction clutches adapted for use on motor vehicles.

One of the objects of the invention is to provide an improved form of actuating mechanism that will be convenient and relatively inexpensive and also so arranged that adjustments for wear may be readily made.

Other objects and the features of novelty will be apparent from the following description, taken in connection with the accompanying drawings of which, Figure 1 is a composite view, partially in side elevation and partially in longitudinal section, of a clutch embodying the invention;

Fig. 2 is a composite view, the upper half being a section on the line 2—2 of Fig. 1, looking in the direction of the arrow, the lower half of the view being a section on the same line but looking in the opposite direction.

Referring to the drawings, 10 indicates a casing which may be secured to a flywheel or other rotating part and which has on its interior a plurality of axially extending keys 11 which carry friction disks 12 and a pressure plate 13. One end of the casing 10 is closed by a cover plate 14 which may be secured to the casing in any preferred manner as by means of bolts 15. A shaft 16 constitutes the power transmitting element with which the casing 10 may be connected by the friction disks, this shaft being rotatably mounted in the casing 10, on the bearing 17 and having a squared portion 18 on which is mounted a spider 19. The spider 19 carries a series of friction disks 20 which are alternately arranged with the disks 12 and coöperate with the latter to transmit power between the casing 10 and the shaft 16.

The pressure plate 13 has loosely arranged thereon a ring 21 provided with a plurality of angularly spaced, radially extending ways 22, three such ways being indicated on the drawings. The hub of the cover plate 14 is interiorly screw-threaded at 23 and has adjustably mounted therein a disk or spider 24. An axially shiftable member 25 is in telescopic arrangement with the member 24 and these two members carry between them a spring 26, which normally tends to separate the members. The member 25 has a sliding engagement with the shaft 16 at 27, and has pivoted thereto a plurality of yokes 28, the pivots of these yokes being indicated at 29. The member 24 has secured thereon a plurality of brackets 30, having radially extending inclined ways 31 opposed to the ways 22. From Fig. 1, it will be evident that the ways 22, although slightly curved, are inclined outwardly away from the friction disks. The ways 31 are so inclined as to be, generally speaking, substantially parallel with the ways 22.

Each of the yokes 28 carries a pair of rollers indicated at 32 and 33, which coöperate with the ways 31 and 22 respectively.

The member 25 is extended to the exterior of the member 24 and carries a ball thrust bearing 34 on which is mounted a collar 35. The collar 35 does not rotate and has, in accordance with the customary arrangement, suitable actuating mechanism connected therewith for effecting the engagement or release of the friction disks. This actuating mechanism is not shown in the drawings.

A ring 36 bears on the ends of the keys 11 and has openings for a plurality of bolts 37 which are firmly secured in the pressure plate 13. Springs 38 are arranged on the bolts 37 and normally tend to draw the pressure plate 13 toward the ring 36.

From Fig. 1 it will be apparent that movement of the member 25 toward the friction disks will have a tendency to straighten up the yokes 28 which are, in effect, toggle members, and the action of the rollers 32 and 33 on their respective ways will cause the pressure plate 13 to be moved in the direction to compress the friction disks 12 and 20 together, and thus effect the driving of the shaft 16, from the casing 10 or vice versa. The spring 26 is made of proper strength to overcome the several springs 38 and thus it will be seen that the action of the spring 26 will be to normally hold the friction disks in engagement. When it is desired to disengage the friction disks the member 25 is moved toward the right in Fig. 1 by means of the collar 35.

The novel arrangement of the ways 22 and 31 and the rollers 32 and 33 is such as to create a very powerful toggle action in compressing the friction disks together and also allows for the taking up of wear in the disks. The member 24 may be adjusted axially, by means of the screw threads 23 for this purpose also.

While we have shown the ways 22 as slightly curved, yet they may be straight like the ways 31. We have not attempted to describe all of the details of the construction, such as oiling devices and other well-known features, but it will be understood that such will be provided in accordance with well-known practices.

Having described the invention what is claimed is:—

In a friction clutch, the combination of coaxially arranged driving and driven members, one of which is in the form of a casing, a series of friction disks whereby one of said members may drive the other, a pressure plate associated with said disks and having on one side thereof a loose ring provided with a plurality of radial cam surfaces, inclined away from said disks in an outward radial direction, a member adjustable in an axial direction on said casing member and having surfaces opposed to each of said cam surfaces and inclined so as to be substantially parallel therewith, an axially movable spring-pressed member, members operatively connected with said spring-pressed member and having means contacting with each pair of said opposed surfaces, and non-rotatable means for shifting said spring-pressed member in opposition to the spring pressure thereon.

In testimony whereof we affix our signatures.

VIVIAN R. BRUCE.
RICHARD G. DICKENS.